(12) United States Patent
Chiang et al.

(10) Patent No.: US 8,368,285 B2
(45) Date of Patent: Feb. 5, 2013

(54) ELECTROCHEMICAL ACTUATORS

(75) Inventors: Yet-Ming Chiang, Framingham, MA (US); Timothy E. Chin, San Jose, CA (US); Michael J. Cima, Winchester, MA (US); J. Richard Gyory, Sudbury, MA (US)

(73) Assignees: Massachusette Institute of Technology, Cambridge, MA (US); SpringLeaf Therapeutics, Boston, MA (US)

( * ) Notice: Subject to any disclaimer, the term of this patent is extended or adjusted under 35 U.S.C. 154(b) by 0 days.

(21) Appl. No.: 13/328,504

(22) Filed: Dec. 16, 2011

(65) Prior Publication Data

US 2012/0175998 A1    Jul. 12, 2012

Related U.S. Application Data

(60) Provisional application No. 61/424,293, filed on Dec. 17, 2010, provisional application No. 61/443,107, filed on Feb. 15, 2011.

(51) Int. Cl.
*H91L 41/08* (2006.01)

(52) U.S. Cl. ........................................................ 310/311

(58) Field of Classification Search .................. 310/311, 310/328
See application file for complete search history.

(56) References Cited

U.S. PATENT DOCUMENTS

| | | | |
|---|---|---|---|
| 3,573,511 A | 4/1971 | Noren | |
| 4,060,741 A | 11/1977 | Schafft | |
| 4,093,885 A | 6/1978 | Brown | |
| 4,194,062 A | 3/1980 | Carides et al. | |
| 4,382,882 A | 5/1983 | Vogel et al. | |
| 4,648,271 A | 3/1987 | Woolf | |
| 5,016,047 A | 5/1991 | Meacham | |
| 5,255,809 A | 10/1993 | Ervin et al. | |
| 5,268,082 A | 12/1993 | Oguro et al. | |
| 5,351,164 A | 9/1994 | Grigortchak et al. | |
| 5,432,395 A | 7/1995 | Grahn | |
| 5,478,668 A | 12/1995 | Gozdz et al. | |
| 5,567,284 A | 10/1996 | Bauer et al. | |
| 5,671,905 A | 9/1997 | Hopkins, Jr. | |

(Continued)

FOREIGN PATENT DOCUMENTS

DE    19809483 A1    9/1999
DE    10026264 A1    11/2001

(Continued)

OTHER PUBLICATIONS

[No Author Listed] Biovalue Products, Technologies: e-Patch. Jun. 26, 2006. Available at http://www.valeritas.com/epatch.shtml.

(Continued)

*Primary Examiner* — Mark Budd
(74) *Attorney, Agent, or Firm* — Wolf, Greenfield & Sacks, P.C.

(57) ABSTRACT

Devices and methods for providing electrochemical actuation are described herein. In one embodiment, an actuator device includes an electrochemical cell including a negative electrode and a positive electrode At least a portion of the negative electrode is formed with a material formulated to at least one of intercalate, de-intercalate, alloy with, oxidize, reduce, or plate with a first portion of the positive electrode to an extent different than with a second portion of the positive electrode such that a differential strain is imparted between the first portion and the second portion of the positive electrode and such that at least a portion of the electrochemical cell is displaced. The electrochemical cell includes a portion that is pre-bent along an axis of the electrochemical cell to define a fold axis and the displacement of the at least a portion of the electrochemical cell is maximized along the fold axis.

23 Claims, 12 Drawing Sheets

U.S. PATENT DOCUMENTS

| | | | |
|---|---|---|---|
| 5,747,915 A | 5/1998 | Benavides |
| 5,770,913 A | 6/1998 | Mizzi |
| 5,800,420 A | 9/1998 | Gross et al. |
| 5,848,911 A | 12/1998 | Garcin |
| 5,858,001 A | 1/1999 | Tsals et al. |
| 5,866,971 A | 2/1999 | Lazarus et al. |
| 5,907,211 A | 5/1999 | Hall et al. |
| 5,954,079 A | 9/1999 | Barth et al. |
| 5,957,895 A | 9/1999 | Sage et al. |
| 5,986,864 A | 11/1999 | Davis |
| 5,989,423 A | 11/1999 | Kamen et al. |
| 6,098,661 A | 8/2000 | Yim et al. |
| 6,109,852 A | 8/2000 | Shahinpoor et al. |
| 6,400,489 B1 | 6/2002 | Suzuki et al. |
| 6,517,972 B1 | 2/2003 | Amatucci |
| 6,530,900 B1 | 3/2003 | Daily et al. |
| 6,545,384 B1 | 4/2003 | Pelrine et al. |
| 6,555,945 B1 | 4/2003 | Baughman et al. |
| 6,577,039 B2 | 6/2003 | Ishida et al. |
| 6,586,810 B2 | 7/2003 | Thakur |
| 6,589,229 B1 | 7/2003 | Connelly et al. |
| 6,599,662 B1 | 7/2003 | Chiang et al. |
| 6,682,500 B2 | 1/2004 | Soltanpour et al. |
| 6,687,536 B1 | 2/2004 | Beck et al. |
| 6,689,100 B2 | 2/2004 | Connelly et al. |
| 6,699,218 B2 | 3/2004 | Flaherty et al. |
| 6,752,787 B1 | 6/2004 | Causey, III et al. |
| 6,828,062 B2 | 12/2004 | Lu et al. |
| 6,938,945 B2 | 9/2005 | Wald et al. |
| 6,960,192 B1 | 11/2005 | Flaherty et al. |
| 6,982,514 B1 | 1/2006 | Lu et al. |
| 7,005,078 B2 | 2/2006 | Van Lintel et al. |
| 7,014,625 B2 | 3/2006 | Bengtsson |
| 7,025,743 B2 | 4/2006 | Mann et al. |
| 7,044,928 B2 | 5/2006 | LeMay et al. |
| 7,115,108 B2 | 10/2006 | Wilkinson et al. |
| 7,144,384 B2 | 12/2006 | Gorman et al. |
| 7,156,838 B2 | 1/2007 | Gabel et al. |
| 7,205,669 B2 | 4/2007 | Miyazaki |
| 7,273,889 B2 | 9/2007 | Mermelstein et al. |
| 7,274,128 B1 | 9/2007 | Liu et al. |
| 7,298,017 B1 | 11/2007 | Liu et al. |
| 7,364,568 B2 | 4/2008 | Angel et al. |
| 7,410,476 B2 | 8/2008 | Wilkinson et al. |
| 7,435,362 B2 | 10/2008 | Muraoka et al. |
| 7,444,812 B2 | 11/2008 | Kirkpatirck et al. |
| 7,449,090 B2 | 11/2008 | Andrews et al. |
| 7,541,715 B2 | 6/2009 | Chiang et al. |
| 7,569,050 B2 | 8/2009 | Moberg et al. |
| D602,155 S | 10/2009 | Foley et al. |
| D602,586 S | 10/2009 | Foley et al. |
| 7,632,247 B2 | 12/2009 | Adams |
| 7,652,907 B2 | 1/2010 | Bloch et al. |
| 7,733,000 B2 | 6/2010 | Kudoh |
| 7,828,771 B2 | 11/2010 | Chiang et al. |
| 7,829,213 B2 | 11/2010 | Jacobson et al. |
| 7,872,396 B2 | 1/2011 | Chiang et al. |
| 7,923,895 B2 | 4/2011 | Chiang et al. |
| 7,994,686 B2 | 8/2011 | Chiang et al. |
| 7,999,435 B2 | 8/2011 | Chiang et al. |
| 8,093,781 B2 | 1/2012 | Chiang et al. |
| 2001/0053887 A1 | 12/2001 | Douglas et al. |
| 2002/0039620 A1 | 4/2002 | Shahinpoor et al. |
| 2003/0135159 A1 | 7/2003 | Daily et al. |
| 2003/0167035 A1 | 9/2003 | Flaherty et al. |
| 2003/0170166 A1 | 9/2003 | Smalley et al. |
| 2004/0038251 A1 | 2/2004 | Smalley et al. |
| 2005/0090803 A1 | 5/2005 | Bailey et al. |
| 2005/0119618 A1 | 6/2005 | Gonnelli |
| 2005/0227071 A1 | 10/2005 | Muraoka et al. |
| 2006/0095014 A1 | 5/2006 | Ethelfeld |
| 2006/0102455 A1 | 5/2006 | Chiang et al. |
| 2006/0169954 A1 | 8/2006 | Smela et al. |
| 2006/0206099 A1 | 9/2006 | Olsen |
| 2006/0231399 A1 | 10/2006 | Smalley et al. |
| 2007/0021733 A1 | 1/2007 | Hansen et al. |
| 2007/0049865 A1 | 3/2007 | Radmer et al. |
| 2007/0112301 A1 | 5/2007 | Preuthun et al. |
| 2007/0254216 A1 | 11/2007 | Hara et al. |
| 2007/0282269 A1 | 12/2007 | Carter et al. |
| 2007/0287753 A1 | 12/2007 | Charney et al. |
| 2007/0299397 A1 | 12/2007 | Alferness et al. |
| 2007/0299398 A1 | 12/2007 | Alferness et al. |
| 2007/0299399 A1 | 12/2007 | Alferness et al. |
| 2007/0299400 A1 | 12/2007 | Alferness et al. |
| 2007/0299401 A1 | 12/2007 | Alferness et al. |
| 2007/0299408 A1 | 12/2007 | Alferness et al. |
| 2008/0009805 A1 | 1/2008 | Ethelfeld |
| 2008/0015494 A1 | 1/2008 | Santini et al. |
| 2008/0043515 A1 | 2/2008 | Bloch |
| 2008/0051710 A1 | 2/2008 | Moberg et al. |
| 2008/0058718 A1 | 3/2008 | Adams et al. |
| 2008/0157713 A1 | 7/2008 | Chiang et al. |
| 2008/0160373 A1 | 7/2008 | Schumm |
| 2008/0167620 A1 | 7/2008 | Adams et al. |
| 2008/0215006 A1 | 9/2008 | Thorkild |
| 2008/0255516 A1 | 10/2008 | Yodfat et al. |
| 2008/0257718 A1 | 10/2008 | Chiang et al. |
| 2008/0269687 A1 | 10/2008 | Chong et al. |
| 2008/0281270 A1 | 11/2008 | Cross et al. |
| 2008/0317615 A1 | 12/2008 | Banister |
| 2008/0319414 A1 | 12/2008 | Yodfat et al. |
| 2009/0014320 A1 | 1/2009 | Chiang et al. |
| 2009/0028824 A1 | 1/2009 | Chiang et al. |
| 2009/0036867 A1 | 2/2009 | Glejboel et al. |
| 2009/0054866 A1 | 2/2009 | Teisen-Simony et al. |
| 2009/0062747 A1 | 3/2009 | Saul |
| 2009/0088693 A1 | 4/2009 | Carter |
| 2009/0088694 A1 | 4/2009 | Carter et al. |
| 2009/0088722 A1 | 4/2009 | Wojcik |
| 2009/0099521 A1 | 4/2009 | Gravesen et al. |
| 2009/0099522 A1 | 4/2009 | Kamen et al. |
| 2009/0124997 A1 | 5/2009 | Pettis et al. |
| 2009/0163855 A1 | 6/2009 | Shin et al. |
| 2009/0163874 A1 | 6/2009 | Krag et al. |
| 2009/0171324 A1 | 7/2009 | Chong et al. |
| 2009/0182277 A1 | 7/2009 | Carter |
| 2009/0192471 A1 | 7/2009 | Carter et al. |
| 2009/0198215 A1 | 8/2009 | Chong et al. |
| 2009/0326454 A1 | 12/2009 | Cross et al. |
| 2009/0326455 A1 | 12/2009 | Carter |
| 2009/0326472 A1 | 12/2009 | Carter et al. |
| 2010/0007248 A1 | 1/2010 | Chiang et al. |
| 2010/0022992 A1 | 1/2010 | Genosar et al. |
| 2010/0063438 A1 | 3/2010 | Bengtsson |
| 2010/0129699 A1 | 5/2010 | Mikhaylik et al. |
| 2010/0304215 A1 | 12/2010 | Suh et al. |
| 2011/0042204 A1 | 2/2011 | Chiang et al. |
| 2011/0098643 A1 | 4/2011 | Chiang et al. |
| 2012/0025671 A1 | 2/2012 | Chiang et al. |
| 2012/0146453 A1 | 6/2012 | Chiang et al. |

FOREIGN PATENT DOCUMENTS

| | | | |
|---|---|---|---|
| EP | 1 621 875 A1 | 2/2006 |
| EP | 2 015 806 A1 | 1/2009 |
| JP | 4127885 A | 4/1992 |
| JP | 10-214641 A | 8/1998 |
| JP | 2001-054899 A | 2/2001 |
| JP | 2001-144342 A | 5/2001 |
| JP | 2002-246720 A | 8/2002 |
| JP | 2005-108523 A | 4/2005 |
| JP | 2006-014562 A | 1/2006 |
| SU | 1099127 A1 | 6/1984 |
| WO | WO-95/15589 A1 | 6/1995 |
| WO | WO-96/34417 A1 | 10/1996 |
| WO | WO-2004/067066 A1 | 8/2004 |
| WO | WO-2005/124918 A2 | 12/2005 |
| WO | WO-2006/123329 A2 | 11/2006 |
| WO | WO-2007/010522 A1 | 1/2007 |
| WO | WO-2007/111880 A2 | 10/2007 |
| WO | WO-2007/129317 A1 | 11/2007 |
| WO | WO-2008/036122 A2 | 3/2008 |
| WO | WO-2008/094196 A2 | 8/2008 |
| WO | WO-2008/129549 A1 | 10/2008 |
| WO | WO-2009/123672 A2 | 10/2009 |

OTHER PUBLICATIONS

[No Author Listed] CODMAN 3000. Johnson & Johnson Company. 2 pages.

Barvosa-Carter et al., Solid-state actuation based on reversible Li electroplating. Smart Structures and Materials 2005: Active Materials: Behavior and Mechanics, Proceedings of SPIE. vol. 5761, 90-97.

Baughman, Conducting Polymer Artificial Muscles. Synthetic Metals. 1996;78:339-353.

Bruesewitz, Elektrochmische Aktoren. F&M Feinwerktechnik Mikrotechnik, Hanser, Munchen, DE. Jul. 1, 1998;106(7/08):527-30. German.

Che et al., An Electrochemically Driven Actuator Based on a Nanostructured Carbon Material. Anal. Chem. 1999;71:3187-3191.

Chin et al., Lithium Rechargeable Batteries as Electromechanical Actuators. Electrochemical and Solid State Letters. 2006;9(3):A134-38.

European Supplemental Search Report for EP 05758772.7 mailed Mar. 5, 2010.

Gu et al., V2O5 Nanofibre Sheet Actuators. Nature Materials. 2003;2:316-19.

International Preliminary Report on Patentability for Application Serial No. PCT/US2009/001075, filed Feb. 20, 2009, mailed Sep. 2, 2010.

International Preliminary Report on Patentability for International Application Serial No. PCT/US2005/020554 dated Mar. 4, 2008.

International Preliminary Report on Patentability for International Application Serial No. PCT/US2007/010036 dated Oct. 28, 2008.

International Preliminary Report on Patentability for International Application Serial No. PCT/US2007/016849 dated Jan. 27, 2009. [mailed Feb. 5, 2009].

International Search Report and Written Opinion for International Application Serial No. PCT/US2005/020554 dated Feb. 7, 2008.

International Search Report and Written Opinion for PCT/US2007/010036, filed Apr. 26, 2007, mailed May 21, 2008.

International Search Report and Written Opinion for PCT/US2007/016849, filed Jul. 26, 2007, mailed Sep. 24, 2008.

International Search Report and Written Opinion for PCT/US2011/065508 mailed Jun. 8, 2012.

International Search Report for International Patent Application Serial No. PCT/US2009/001075, filed Feb. 20, 2009, mailed May 25, 2010.

Invitation to Pay Additional Fees for PCT/US2011/065508 mailed Mar. 27, 2012.

Koyama et al., Harnessing the Actuation Potential of Solid-State Intercalation Compounds. Adv Funct Mater. 2006;16:492-98.

Lin et al., Towards Electrochemical Artificial Muscles: A supramolecular Machine Based on a One-Dimensional Copper-Containing Organophosphonate System. Angew Chem Int Ed. 2004;43:4186-89.

Massey et al., Graphite intercalation compounds as actuation materials. 2004 Proceedings of IMECE04: 2004 ASME International Mechanical Engineering Congress and Exposition. 2004:117-22.

Massey et al., Reversible work by electrochemical intercalation of graphitic materials. Smart Structures and Materials 2005: Electroactive Polymer Actuators and Devices (EAPAD), Proceedings of SPIE. 2005;5759:322-30.

Niezrecki et al., Piezoelectric Actuation: State of the Art. The Shock and Vibration Digest. Jul. 2001;33(4):269-80.

Osborne, Valeritas' Insulin Patch Takes Aim At Type II Drug Resisters. BioWorld Financial Watch. 2006;14(36):1 page.

Paquette, et al., Ionomeric Electroactive Polymer Artificial Muscle for Naval Applications. IEEE Journal of Oceanic Engineering. 2004;29)(3):729-37.

Prechtl et al., Design of a high efficiency, large stroke, electrochemical actuator. Smart Mater Struct. 1999;8:13-30.

Shahinpoor et al., Ionic Polymer-Metal Composites (IPMC) as Biomimetic Sensors and Actuators. Proceedings of SPIE's 5th Annual International Symposium on Smart Structures and Materials, Mar. 1-5, 1998, San Diego, CA. Paper No. 3324-27.

Spinks et al., Pheumantic Carbon Nanotube Actuators. Adv Mater. 2002;14(23):1728-32.

Takada et al., Electrochemical Actuator with Silver Vanadium Bronzes. Solid State Ionics. 1992;53-56:339-342.

Thomson, Moving Toward Morphing Vehicles. MIT TechTalk. Mar. 22, 2006;50(21):1-8.

Yamada et al., Optimized LiFePO4 for Lithium Battery Cathodes. Journal of the Electrochemical Society. Jan. 1, 2001;148(3):A224-229.

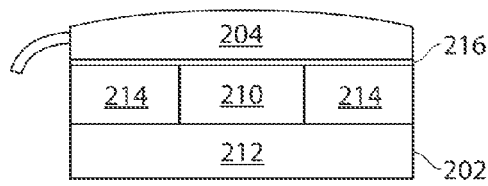
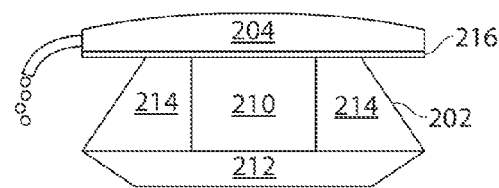
Fig. 2A                Fig. 2B
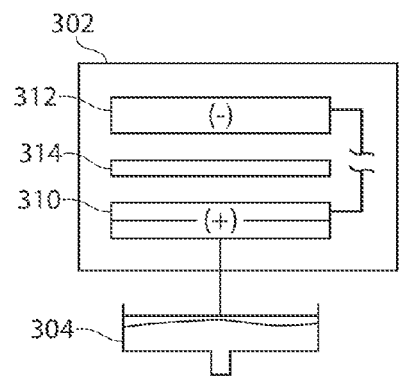
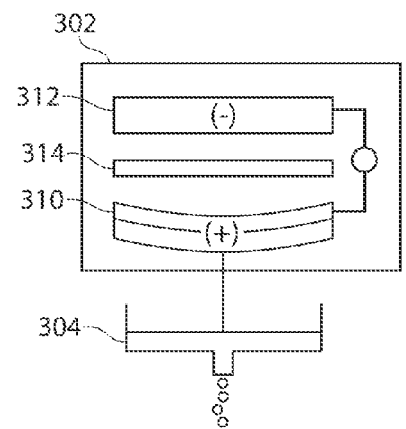
Fig. 3A                Fig. 3B

| Sample | Pre-bend | Time to 2 mm | Displacement at 40 h |
|---|---|---|---|
| 50 | 0.5 mm | 31.30 h | 2.64 mm |
| 60 | 0.5 mm | 25.53 h | 2.74 mm |
| 61 | 0.5 mm | 26.65 h | 2.96 mm |
| 62 | 0.5 mm | 24.47 h | 3.42 mm |
| 71 | 1.0 mm | 23.30 h | 3.68 mm |
| 72 | 1.0 mm | 22.15 h | 4.08 mm |
| 75 | 1.5 mm | 26.43 h | 3.24 mm |
| 76 | 1.5 mm | 30.61 h | 2.77 mm |
| 73 | None | 33.22 h | 2.40 mm |
| 74 | None | 40.89 h | 1.96 mm |

| Sample | Pre-bend | Displacement Rate (mm/h) | Displacement at max rate |
|---|---|---|---|
| B1 | 0.5 mm | 2.339 | 5.55 mm |
| B2 | 0.5 mm | 1.874 | 5.86 mm |
| B3 | 0.5 mm | 1.755 | 6.04 mm |
| F1 | None | 1.552 | 4.61 mm |
| F2 | None | 1.351 | 4.01 mm |
| F3 | None | 1.898 | 3.99 mm |
| F4 | None | 1.959 | 3.29 mm |

| Sample | Pre-bend | Displacement Rate (mm/h) | Displacement at max rate |
|---|---|---|---|
| B1 | 0.5 mm | 2.724 | 6.19 mm |
| B2 | 0.5 mm | 2.205 | 6.75 mm |
| B3 | 0.5 mm | 2.127 | 7.13 mm |
| B4 | 0.5 mm | 2.205 | 7.47 mm |
| F1 | None | 1.859 | 5.76 mm |
| F2 | None | 1.957 | 4.67 mm |
| F3 | None | 2.350 | 3.14 mm |
| F4 | None | 2.039 | 4.78 mm |

US 8,368,285 B2

ELECTROCHEMICAL ACTUATORS

RELATED APPLICATIONS

This application claims priority under 35 U.S.C. §119(e) to U.S. Provisional Patent Application No. 61/424,293, filed Dec. 17, 2010, and entitled "Electrochemical Actuators," and to U.S. Provisional Patent Application No. 61/443,107, filed Feb. 15, 2011, and entitled "Electrochemical Actuators," each of which is incorporated herein by reference in its entirety for all purposes.

BACKGROUND

The invention relates generally to systems, devices, and methods, involving electrochemical actuation.

Actuation generally refers to a mechanism by which an object, or portion of an object, can be adjusted or moved by converting energy (e.g., electric energy, chemical energy, etc.) into mechanical energy. Actuators may be categorized by the manner in which energy is converted. For example, electrostatic actuators convert electrostatic forces into mechanical forces.

Some piezoelectric actuators provide high bandwidth and actuation authority, but low strain (much less than 1% typically), and require high actuation voltages. Shape memory alloys (SMAs), magnetostrictors, and ferromagnetic shape-memory alloys (FSMAs) are capable of larger strain, but may produce slower responses, limiting their applicability. Actuation mechanisms that are based on field-induced domain motion (piezos, FSMAs) can also tend to have low blocked stress. The above actuation methods are based on the use of active materials of high density (lead-based oxides, metal alloys), which can negatively impact weight-based figures of merit. In some known methods of actuation using electrochemistry, the load-bearing actuation materials are in gaseous or liquid phase and may have a low elastic modulus, and consequently low actuation energy density and actuation stress.

Thus, there is a need for improvements in electrochemical actuator devices and systems.

SUMMARY OF THE INVENTION

Devices, systems and methods for providing electrochemical actuation are disclosed herein. In some embodiments, an actuator device includes an electrochemical cell including a negative electrode and a positive electrode At least a portion of the negative electrode is formed with a material formulated to at least one of intercalate, de-intercalate, alloy with, oxidize, reduce, or plate with a first portion of the positive electrode to an extent different than with a second portion of the positive electrode such that a differential strain is imparted between the first portion and the second portion of the positive electrode and such that at least a portion of the electrochemical cell is displaced. The electrochemical cell includes a portion that is partially deflected or distorted (also referred to herein as "pre-bent") from a planar shape along an axis of the electrochemical cell to define a fold axis and the displacement of the at least a portion of the electrochemical cell is maximized along the fold axis. In some cases, the portion is partially deflected or distorted from a planar shape to form a curved, pre-bent portion.

BRIEF DESCRIPTION OF THE DRAWINGS

FIG. 2(a) is a schematic illustration of a portion of a delivery system according to an embodiment illustrating an electrochemical actuator in a charged state; and FIG. 2(b) is a schematic illustration of the portion of the delivery system of FIG. 2(a) illustrating the electrochemical actuator as it discharges.

FIG. 3(a) is a schematic illustration of a portion of a delivery system according to an embodiment illustrating an electrochemical actuator in a charged state and FIG. 3(b) is a schematic illustration of the portion of the delivery system of FIG. 3(a) illustrating the electrochemical actuator as it discharges.

DETAILED DESCRIPTION

Figure 1A:
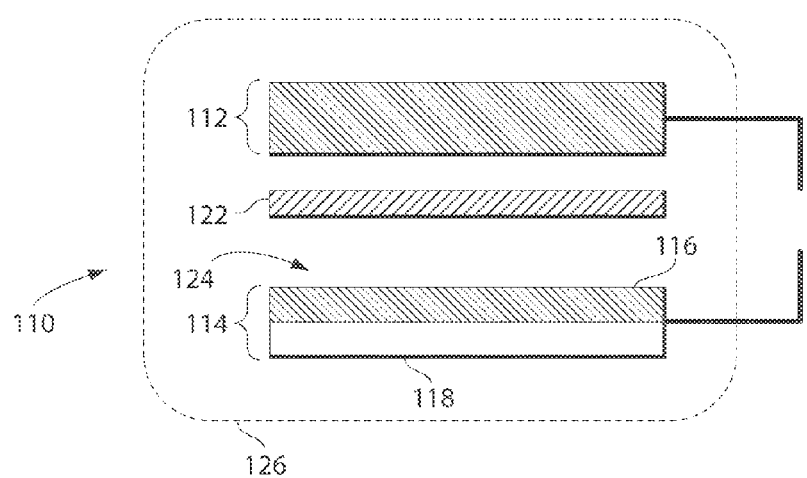
FIG. 1(a) is a schematic illustration of an actuator device shown in a charged state without application of a voltage or current.

Devices, systems and methods are described herein for providing electrochemical actuation. Electrochemical actuators as described herein are based, at least in part, on an electric field-driven intercalation or alloying of high-modulus inorganic compounds, which can produce large and reversible volume changes, providing high actuation energy density, high actuation authority and large free strain.

Electrochemical actuators can provide volume-efficient capabilities that are especially effective in applications where minimal weight and volume are desired. Example applications are those of drug/medication patch pumps that are worn by a patient. In some embodiments, an electrochemical actuator can include a positive electrode and a negative electrode, at least one of which is an actuating electrode. These and other components of the electrochemical actuator can form an electrochemical cell, which can in some embodiments initially be charged. For example, the electrochemical cell may begin discharging when a circuit between the electrodes is closed, causing the actuating electrode to actuate. The actuating electrode can thereby perform work upon another structure.

More specifically, the actuating electrode of an electrochemical actuator can experience a change in volume or position when the closed circuit is formed, and this change in volume or position can perform work upon another structure such as, for example, a fluid source in an application involving the administration of a drug/medication via a pump worn by a patient. For example, the actuating electrode may expand, bend, buckle, fold, cup, elongate, contract, or otherwise experience a change in volume, size, shape, orientation, arrangement, and/or location, such that at least a portion of the actuating electrode experiences a change in volume or position. In some embodiments, such change(s) may be experienced by a portion of the actuating electrode, while the actuating electrode as a whole may experience contrary change(s) or no change whatsoever.

The systems, devices and methods described herein can include various components, features, functions and materials properties, etc. the same as or similar to other electrochemical actuators, such as the electrochemical actuators generally described in U.S. Pat. No. 7,541,715, entitled "Electrochemical Methods, Devices, and Structures" by Chiang et al., U.S. Patent Pub. No. 2008/0257718, entitled "Electrochemical Actuator" by Chiang et al. ("the '718 publication"), and U.S. Patent Pub. No. 2009/0014320 ("the '320 publication"), entitled "Electrochemical Actuator" by Chiang et al., and U.S. Patent Pub. No. 2009/0028824, entitled "Systems and Methods for Delivering Drugs" by Chiang et al., ("the '824 Publication"), the disclosure of each of which is incorporated herein by reference. Such electrochemical actuators can include at least one component that responds to the application of a voltage or current by experiencing a change in volume or position. The change in volume or position can produce mechanical work that can then act on a fluid source or may be transferred to a fluid source, such that a fluid can be delivered out of the fluid source.

An electrochemical actuator as described herein can optionally be pretreated or processed prior to use as an actuator. Pretreatment of an electrochemical actuator may enhance the mechanical performance, stiffness, actuation energy density, actuation strain, reversibility, and/or lifetime of the devices, and/or may reduce creep deformation and hysteresis of strain. In some embodiments, pretreatment of an electrochemical actuator can include masking a portion of the electrochemical actuator such that the location of the electrochemical reaction can be controlled. Examples of such an embodiment are described in the '320 publication incorporated by reference above. In some embodiments, an electrochemical actuator can be pretreated by pre-bending the electrochemical actuator prior to discharging.

For example, in some embodiments, a method of controlling the deformation mode of an electrochemical actuator can include pre-bending the electrochemical actuator prior to the actuator being discharged. An electrochemical cell formed with, for example, a lithium electrode and an aluminum electrode, upon discharge, will typically expand, bend, etc., to a predetermined extent until it eventually folds. The axis of the fold can be determined, by factors, such as, for example, the aspect ratio and/or mechanical properties of the actuator and its constituent material(s). In some electrochemical actuators, such as, for example, an isotropic disc-shaped electrochemical actuator, the fold axis can be oriented randomly. By introducing a pre-bend in the actuator prior to discharge, the folding axis can be defined along the pre-bend. Pre-bending the actuator can also increase the displacement rate of the actuator as well as the total displacement achievable at maximum rate. Examples of such embodiments are described in more detail below.

The folding axis of an electrochemical actuator can be defined at a variety of different locations on the actuator. For example, an actuator can be pre-bent along an axis defined, for example, along a length of the actuator, across a width of the actuator, a line extending diagonally across the actuator or any other desired location to achieve a desired displacement during discharge of the actuator. With a pre-bend formed in the electrochemical actuator, the actuator can have a non-planar configuration prior to charging and/or discharging.

In some embodiments, an actuator device includes an electrochemical cell including a negative electrode and a positive electrode. At least a portion of the negative electrode is formed with a material formulated to at least one of intercalate, de-intercalate, alloy with, oxidize, reduce, or plate with a first portion of the positive electrode to an extent different than with a second portion of the positive electrode such that a differential strain is imparted between the first portion and the second portion of the positive electrode and such that at least a portion of the electrochemical cell is displaced. In some cases, the electrochemical cell includes a portion that is pre-bent along an axis of the electrochemical cell to define a fold axis and the displacement of the at least a portion of the electrochemical cell is maximized along the fold axis. In some cases, at least a portion of at least one of the electrodes is pre-bent prior to charging or discharging of the electrochemical cell, to form a curved portion having a radius of curvature that changes by less than 10% along the length of the curved portion, and such that the displacement of the at least a portion of the electrochemical cell is enhanced relative to an essentially identical electrochemical cell lacking the curved portion, under essentially identical conditions. In some cases, the radius of curvature changes by less than 7%, less than 5%, or less than 1%, along the length of the curved portion. That is, the curved portion may be substantially free of grooves, indentations, folds, or features other than the curvature introduced by the pre-bend. Such curvature may enhance (e.g., increase) the overall displacement of the actuator during charge/discharge of the electrochemical cell.

An example of an electrochemical actuator is shown in the embodiment illustrated in FIG. 1(a). As shown in FIG. 1(a), an electrochemical actuator 110 can include a negative electrode 112 in electrical communication with a positive electrode 114 collectively forming an electrochemical cell. Positive electrode 114 may include a first portion 116 and a second portion 118. In some embodiments, portions 116 and 118 are formed of different materials. Portions 116 and 118 may also have different electrical potentials. For example, portion 116 may include a material that can intercalate, de-intercalate, alloy with, oxidize, reduce, or plate a species to a different extent than portion 118. Portion 118 may be formed of a material that does not substantially intercalate, de-intercalate, or alloy with, oxidize, reduce, or plate the species. In some embodiments, portion 116 may be formed of a material including one or more of aluminum, antimony, bismuth, carbon, gallium, silicon, silver, tin, zinc, or other materials which can expand upon intercalation or alloying or compound formation with lithium. In one embodiment, portion 116 is formed with aluminum, which can expand upon intercalation with lithium. Portion 118 may be formed of copper, since copper does not substantially intercalate or alloy with lithium. In some instances, portion 118 may act as a positive electrode current collector, and may extend outside the electrochemical cell, e.g., to form a tab or current lead. In other embodiments, portion 118 may be joined to a tab or current lead that extends outside the cell. Negative electrode 112 may also include a current collector. Electrochemical actuator 110 may include a separator 122. The separator 122 may be, for example, a porous separator film, such as a glass fiber cloth, or a porous polymer separator. Other types of separators, such as those used in the construction of lithium ion batteries, may also be used. The electrochemical actuator 110 may also include an electrolyte 124, which may be in the form of a liquid, solid, or a gel. The electrolyte may contain an electrochemically active species, such as that used to form the negative electrode. Electrochemical actuator 110 may also include an enclosure 126, such as a polymer packaging, in which negative electrode 112, positive electrode 114 and separator 122 can be disposed.

Figure 1B:
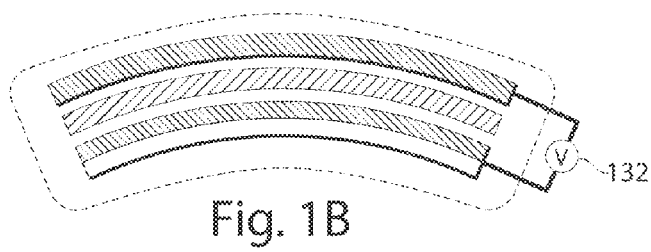
FIG. 1(b) shows the actuator device of FIG. 1(a) with application of a voltage or current, according to an embodiment.

As illustrated in FIG. 1(b), the electrochemical cell may have a voltage 132, such that, when a closed circuit is formed between the negative electrode 112 and the positive electrode 114, an electric current may flow between the two electrodes 112, 114 through the external circuit. If negative electrode 112 is a lithium metal electrode and the electrolyte contains lithium ions, lithium ion current can flow internally from electrode 112 to electrode 114. The intercalation of portion 116 with lithium can result in a dimensional change, such as a volume expansion. In some instances, this volume expansion may reach at least 25%, at least 50%, at least 75%, at least 100%, at least 150%, at least 200%, at least 250%, or at least 300% compared to the initial volume. High volume expansion may occur, for example, when portion 116 is saturated with lithium. As portion 116 increases in volume due to intercalation of lithium, portion 118 to which portion 116 may be bonded, may not substantially expand due to minimal or no intercalation of lithium. Portion 116 thus provides a mechanical constraint. This differential strain between the two portions causes positive electrode 114 to undergo bending or flexure. As a result of the dimensional change and displacement of the positive electrode, actuator system 110 can be displaced from a first orientation to a second orientation. This displacement can occur whether the volumetric or dimensional change (e.g., net volume change) of the electrochemical cell, due to the loss of lithium metal from the negative electrode 112 and formation of lithium intercalated compound or lithium alloy at the positive electrode 114, is positive, zero, or negative. In some cases, the actuator displacement may occur with a volumetric or dimensional change (e.g., net volume change) of the electrochemical actuator 110, or portion thereof, that is positive. In some cases, the actuator displacement may occur with a volumetric or dimensional change (e.g., net volume change) of the electrochemical actuator 110, or portion thereof, that is zero. In some cases, the actuator displacement may occur with a volumetric or dimensional change (e.g., net volume change) of the electrochemical actuator 110, or portion thereof, that is negative.

As used herein, "differential strain" between two portions can refer to the difference in response (e.g., actuation) of each individual portion upon application of a voltage or current to the two portions. That is, a system as described herein may include a component including a first portion and a second portion associated with (e.g., may contact, may be integrally connected to) the first portion, wherein, under essentially identical conditions, the first portion may undergo a volumetric or dimensional change and the second portion does not undergo a volumetric or dimensional change, producing strain between the first and second portions. The differential strain may cause the component, or a portion thereof, to be displaced from a first orientation to a second orientation. In some embodiments, the differential strain may be produced by differential intercalation, de-intercalation, alloying, oxidation, reduction, or plating of a species with one or more portions of the actuator system.

For example, the differential intercalation, de-intercalation, alloying, oxidation, reduction, or plating of portion 116 relative to portion 118 can be accomplished through several means. In one embodiment, portion 116 may be formed of a different material than portion 118, wherein one of the materials substantially intercalates, de-intercalates, alloys with, oxidizes, reduces, or plates a species, while the second portion interacts with the species to a lesser extent. In another embodiment, portion 116 and portion 118 may be formed of the same material. For example, portion 116 and portion 118 may be formed of the same material and may be substantially dense, or porous, such as a pressed or sintered powder or foam structure. In some cases, to produce a differential strain upon operation of the electrochemical cell, portion 116 or 118 may have sufficient thickness such that, during operation of the electrochemical cell, a gradient in composition may arise due to limited ion transport, producing a differential strain. In some embodiments, one portion or an area of one portion may be preferentially exposed to the species relative to the second portion or area of the second portion. In other instances, shielding or masking of one portion relative to the other portion can result in lesser or greater intercalation, de-intercalation, or alloying with the masked or shielded portion compared to the non-masked or shielded portion. This may be accomplished, for example, by a surface treatment or a deposited barrier layer, lamination with a barrier layer material, or chemically or thermally treating the surface of the portion to be masked/shielded to either facilitate or inhibit intercalation, de-intercalation, alloying, oxidation, reduction, or plating with the portion. Barrier layers can be formed of any suitable material, which may include polymers, metals, or ceramics. In some cases, the barrier layer can also serve another function in the electrochemical cell, such as being a current collector. The barrier layer may be uniformly deposited onto the surface in some embodiments. In other cases, the barrier layer may form a gradient in composition and/or dimension such that only certain portions of the surface preferentially facilitate or inhibit intercalation, de-intercalation, alloying, oxidation, reduction, or plating of the surface. Linear, step, exponential, and other gradients are possible. In some embodiments a variation in the porosity across portion 116 or 118, including the preparation of a dense surface layer, may be used to assist in the creation of an ion concentration gradient and differential strain. Other methods of interaction of a species with a first portion to a different extent so as to induce a differential strain between the first and second portions can also be used. In some embodiments, the flexure or bending of an electrode is used to exert a force or to carry out a displacement that accomplishes useful function.

FIGS. 2(a) and 2(b) are each a schematic of an embodiment of an electrochemical actuator 202 illustrating the general principles of operation and function of an electrochemical actuator. As shown, the electrochemical actuator 202 can include a positive electrode 210, a negative electrode 212, and an electrolyte 214. These components can form an electrochemical cell that can initially be discharged and then charged before use, or can be initially charged, as shown in FIG. 2(a). The positive electrode 210 can be configured to expand in the presence of the electrolyte 214. When a circuit between the electrodes 210, 212 is closed, current can travel from the positive electrode 210 to the negative electrode 212. The positive electrode 210 can then experience a change in volume, resulting in longitudinal displacement of at least a portion of the positive electrode 210, as shown in FIG. 2(b).

Thereby, the positive electrode 210 can exert a pumping force or pressure on a fluid reservoir 204, or an associated transfer structure 216. The transfer structure 216 in this embodiment is in the form of a substantially planar plate. The pumping force or pressure can cause fluid (e.g., a therapeutic agent) to be pumped out of the fluid reservoir 204. Thus, the electrochemical actuator 202 can be considered a self-powered electrochemical pump.

In this embodiment, the electrochemical actuator 202 has a positive electrode 210 selected to have a lower chemical potential for the working ion when the electrochemical actuator 202 is charged, and is thereby able to spontaneously accept working ions from the negative electrode 212 as the actuator is discharged. In some embodiments, the working ion can include, but is not limited to, the proton or lithium ion. When the working ion is lithium, the positive electrode 210 can include one or more lithium metal oxides including, for example, $LiCoO_2$, $LiFePO_4$, $LiNiO_2$, $LiMn_2O_4$, $LiMnO_2$, $LiMnPO_4$, $Li_4Ti_5O_{12}$, and their modified compositions and solid solutions; oxide compound comprising one or more of titanium oxide, manganese oxide, vanadium oxide, tin oxide, antimony oxide, cobalt oxide, nickel oxide or iron oxide; metal sulfides comprising one or more of $TiSi_2$, $MoSi_2$, $WSi_2$, and their modified compositions and solid solutions; a metal, metal alloy, or intermetallic compound comprising one or more of aluminum, silver, gold, boron, bismuth, gallium, germanium, indium, lead, antimony, silicon, tin, or zinc; a lithium-metal alloy; or carbon comprising one or more of graphite, a carbon fiber structure, a glassy carbon structure, a highly oriented pyrolytic graphite, or a disordered carbon structure. The negative electrode 212 can include, for example, lithium metal, a lithium metal alloy, or any of the preceding compounds listed as positive electrode compounds, provided that such compounds when used as a negative electrode are paired with a positive electrode that is able to spontaneously accept lithium from the negative electrode when the actuator is charged. These are just some examples, as other configurations are also possible.

In some embodiments, the electrochemical actuator can include an anode, a cathode, and a species, such as a lithium ion. At least one of the electrodes can be an actuating electrode that includes a first portion and a second portion. The portions can have at least one differing characteristic, such that in the presence of a voltage or current, the first portion responds to the species in a different manner than the second portion. For example, the portions can be formed from different materials, or the portions can differ in thickness, dimension, porosity, density, or surface structure, among others. The electrodes can be charged, and when the circuit is closed, current can travel. The species can, intercalate, de-intercalate, alloy with, oxide, reduce, or plate with the first portion to a different extent than the second portion. Due to the first portion responding differently to the species than the second portion, the actuating electrode can experience a change in one or more dimensions (and thus a change in volume), shape, orientation, or position.

An example of such an embodiment is shown in FIGS. 3(*a*) and 3(*b*), which are each a schematic view of another embodiment of an electrochemical actuator 302. The electrochemical actuator 302 can include a positive electrode 310, a negative electrode 312, and a species 314. The species 314 can be an electrolyte that includes, for example, a lithium ion. The positive electrode 310 can include a first portion and a second portion. The first portion can include a material that is dimensionally active when in the presence of the species. For example, aluminum expands upon alloying with, or being intercalated by, lithium. The second portion can include a material that is not dimensionally active when in the presence of the species, or is relatively less dimensionally active than the material of the first portion. For example, copper does not substantially intercalate or alloy with lithium. Thus, the positive electrode 310 can be considered a bimorph structure, with one of the portions serving as a positive current collector.

The negative electrode 312 can serve as a negative current collector. For example, the negative electrode 312 can include a layer of lithium metal bonded to or deposited on a layer of copper. Initially, the electrodes can be charged but may not form a closed circuit, as shown in FIG. 3(*a*). The positive electrode 310 can have a lower chemical potential for lithium than the negative electrode 312, such that when the circuit between the two electrodes is closed, as shown in FIG. 3(*b*), current can flow toward the negative electrode 312. The first portion of the positive electrode 310 can alloy or intercalate with the lithium, causing an expansion in volume, while the second portion can act as a mechanical constraint. Thereby, the positive electrode 310 will bend or otherwise displace. The displacement of the positive electrode 310 can be transferred to a fluid reservoir 304, causing the fluid reservoir 304 to expel fluid.

Figure 4A:
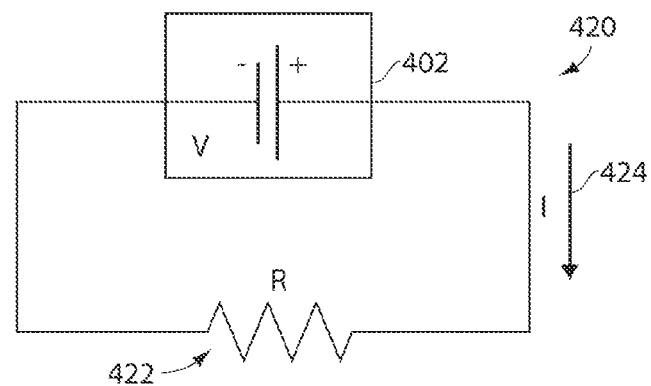
FIGS. 4(a) and 4(b) are each a schematic illustration of a different embodiment of an electrical circuit that can be used with a delivery system.
Figure 4B:
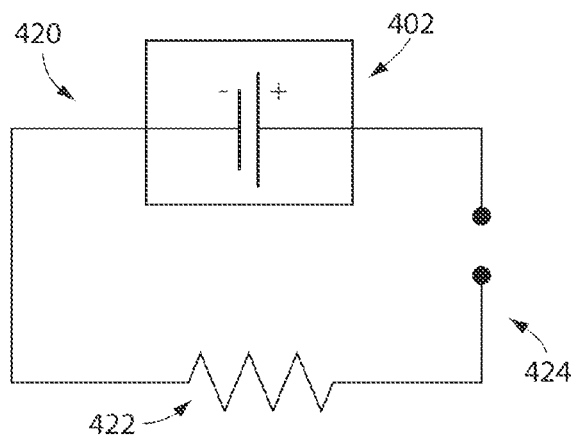

FIG. 4(*a*) is a schematic illustration of an embodiment of an electrical circuit 420 that can be used to power an electrochemical actuator within a delivery system. As shown, the electrical circuit 420 can include an electrochemical actuator 402 positioned in electrical communication with a resistor 422. The resistor 422 can have a relatively constant electrical resistance. When the electrical circuit 420 is closed, as shown in FIG. 4(*a*), a current 424 can be induced in the electrical circuit 420 and the electrochemical actuator 402 can begin discharging across the resistor 422, simultaneously causing the electrochemical actuator 402 to actuate. In some embodiments, the electrical circuit can include electrical contacts (not shown) that can open or close the electrical circuit. For example, when the electrical contacts are in communication with each other, the electrical circuit will be closed (as shown in FIG. 4(*a*)) and when they are not in contact with each other, the electrical circuit can be opened or broken, as shown in FIG. 4(*b*).

The discharge of the electrochemical actuator 402 can be relatively proportional to the current 424 traveling through the electrical circuit 420 (i.e., the electrical resistance of the resistor 422). Because the electrical resistance of the resistor 422 can be relatively constant, the electrochemical actuator 402 can discharge at a relatively constant rate. Thus, the discharge of the electrochemical actuator 402, and thus the displacement of the electrochemical actuator 402 can be relatively linear with the passage of time.

In other embodiments, an electrical circuit can be used that includes a variable resistor. By varying the resistance, the discharge rate of the electrochemical actuator and the corresponding displacement of the electrochemical actuator can be varied, which in turn can vary the fluid flow rate from the fluid source. An example of such an embodiment is described in the '824 Publication incorporated by reference above. In some embodiments, an electrical circuit can be used that uses a switch to open or close the electrical circuit. When the switch is closed, the electrochemical actuator can discharge and when the switch is opened, the electrochemical actuator can be prevented from discharging. An example of such an embodiment is described in the '824 Publication incorporated by reference above.

An electrochemical actuator that is pre-bent to control the deformation properties of the electrochemical actuator is shown in FIGS. 5(*a*)-5(*e*). An electrochemical actuator 502 can include a positive electrode 510 and a negative electrode 512 that collectively form an electrochemical cell. The positive electrode 510 can be formed at least in part with a metal such as, for example, aluminum or tin, and negative electrode 512 can be formed with, for example, a metal that can alloy with the material of the positive electrode 510, such as a lithium metal. Alternatively, the electrodes can be formed of any of the materials described above in connection with the other actuator embodiments. The positive electrode 510 can include a first portion 516 and a second portion 518. The first portion 516 can be in contact with the negative electrode 510. The first portion 516 can include, for example, a surface of the positive electrode 510 and/or the surface of the positive electrode 510 and a portion of the positive electrode 516 extending into a depth of the positive electrode. The electrochemical actuator 502 can have a length L and a width W, as shown in FIG. 5(c), and a depth D, as shown in FIG. 5(a).

Figure 5A:
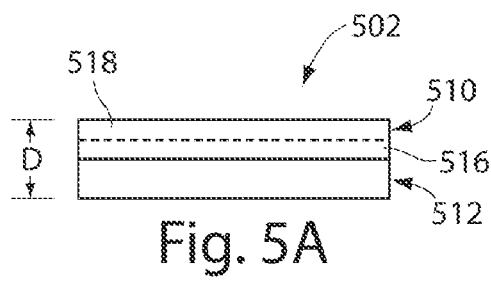
FIG. 5(a) is a schematic illustration of an electrochemical actuator, according to an embodiment, shown in a charged state.
Figure 5B:
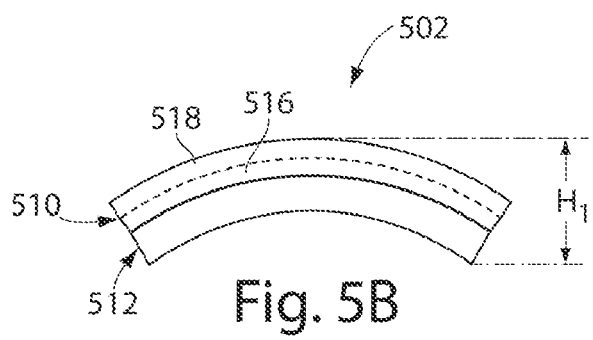
FIG. 5(b) is a schematic illustration of the electrochemical actuator of FIG. 5(a) shown in a discharged state.

The negative electrode 512 can serve as a negative current collector. Initially, the electrodes 510, 512 can be charged but may not form a closed circuit, as shown in FIG. 5(a). When the circuit between the two electrodes 510, 512 is closed, as shown in FIG. 5(b), current can flow toward the negative electrode 512. The first portion 516 of the positive electrode 510 can alloy or intercalate with the lithium material of the negative electrode 512, causing an expansion in volume, while the second portion 518 can act as a mechanical constraint. This will cause the positive electrode 510 to bend or otherwise displace as described for previous embodiments. For example, as shown in FIG. 5(b) the electrochemical actuator can be displaced from a height or depth of D to a height or depth of H1 achieving a displacement of $H_1-D$.

Specifically, the electrochemical reactions for such a lithium/aluminum electrochemical cell are as follows.

Li→Li$^+$+e$^-$                              Anodic Reaction

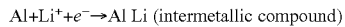

Al+Li$^+$+e$^-$→Al Li (intermetallic compound)     Cathodic Reaction

As the reactions proceed, the lithium of the negative electrode 510 alloys with the aluminum of the positive electrode 512, forming a LiAl compound at least on the surface of the positive electrode. This compound can grow in thickness over time (e.g., within the first portion 516). This compound can have a larger lattice constant than the underlying pure aluminum base of the second portion 518 of the positive electrode 512. Because of this lattice mismatch, stress can build up within the underlying aluminum material of the second portion 518 and eventually this stress will cause the positive electrode 512 to bend.

As previously described, upon discharge, such electrochemical actuators expand, bend, buckle, fold, cup, elongate, contract, or otherwise experience a change in volume, size, shape, orientation, arrangement, or location, such that at least a portion of the electrochemical actuator 502 experiences a change in volume or position. Eventually, the electrochemical actuator 502 will fold along an axis of the electrochemical actuator. The folding axis can be determined, for example, by factors, such as, the aspect ratio and mechanical properties of the electrochemical actuator 502.

Figure 5C:
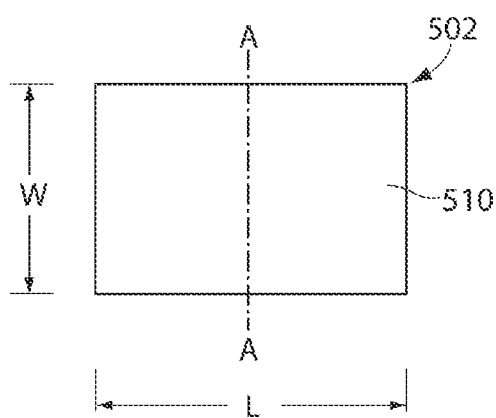
FIG. 5(c) is a schematic illustration of a top view of the electrochemical actuator of FIG. 5(a).

To increase a rate of displacement and/or a total displacement of the electrochemical actuator 502, a pre-bend can be introduced into the electrochemical actuator 502 prior to discharge. For example, in some embodiments, a pre-bend can be introduced into the actuator 502 by forming the actuator 502 over a cylindrical object. The folding axis when the electrochemical actuator 502 is displaced can be predisposed to be defined along the pre-bend axis of the actuator 502. In this embodiment, a curved pre-bend is introduced at axis A-A across the width W of the electrochemical actuator 502 and substantially disposed at a centerline of the length L of the electrochemical actuator 502, as shown in FIG. 5(c). The pre-bend axis defines a centerline of the eventual fold or bend of the actuator.

Figure 5D:
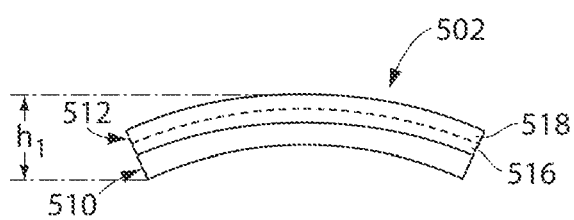
FIG. 5(d) is a schematic illustration of the electrochemical actuator of FIG. 5(a) with a pre-bend and shown in a charged state.
Figure 5E:
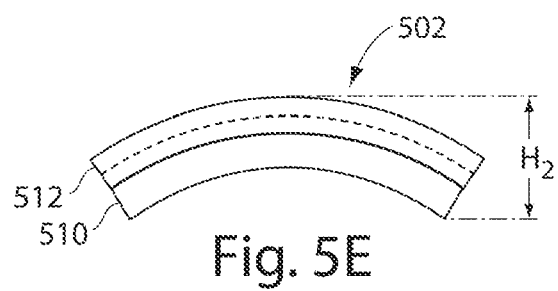
FIG. 5(e) is a schematic illustration of the electrochemical actuator of FIG. 5(d) shown in a discharged state.

FIG. 5(d) illustrates the electrochemical actuator 502 in a charged state and with a pre-bend height or depth of h1 along axis A-A (FIG. 5(c)). When the electrochemical actuator 502 is discharged, the electrochemical actuator 502 can be displaced to a height or of H$_2$ (as shown in FIG. 5(e)) and achieve a displacement of H2−h1 that is greater than the displacement $H_1-D$ (FIG. 5(b)), achieved without the pre-bend. The rate of displacement can also be increased. For example, in one example actuation of the actuator 502 without a pre-bend, the actuator 502 can be discharged through a fixed 10 ohm resistor for 10 hours and can achieve displacement rates of, for example, less than 0.5 mm h$^{-1}$. When a pre-bend of about 0.7-0.8 mm (vertical height difference) is added to the actuator 502, a steady-state displacement rate of, for example, 0.5-0.6 mm h$^{-1}$ can be achieved when discharged through a fixed 10 ohm resistor for 10 hours.

In some embodiments, a pre-bend can be introduced into an electrochemical actuator in a direction along a length of the electrochemical. In some embodiments, the pre-bend can define a fold-line substantially along a center-line of the electrochemical actuator. For example, a pre-bend can be introduced across a width of the electrochemical actuator and substantially along a centerline of a length of the electrochemical actuator. In some embodiments, a pre-bend can be introduced across a length of the electrochemical actuator and substantially along a centerline of a width of the electrochemical actuator. In some embodiments, a pre-bend can be introduced along a length or width of the electrochemical actuator and at a non-zero distance from a center-line of the electrochemical actuator.

The size or height of the pre-bend can also vary. For example, the desired size of the pre-bend may depend on various factors, such as the size of the actuator, the materials used in the actuator, the expected use for the actuator, the desired displacement, the desired displacement rate, etc. Although, the example embodiments of an electrochemical actuator described herein describe a pre-bend being formed in a rectangular shaped electrochemical actuator, it should be understood that a pre-bend can be introduced into electrochemical actuators having any shape, such as, for example, square, circular or disc-shaped, oval or elliptical shaped, or other desired shapes. The shape of the pre-bend can also vary. For example, the pre-bend can be formed so that the entire actuator has a constant radius of curvature (such as shown in FIG. 5(d)) and the radius of curvature can be of a variety of different values. Alternatively, the pre-bend can be formed so that only a portion of the actuator is curved while the remainder is straight (producing an actuator with a V-shape).

Figure 5F:
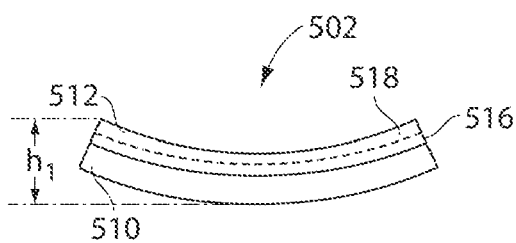
FIG. 5(f) is a schematic illustration of the electrochemical actuator of FIG. 5(a) with a pre-bend defined in an opposite direction than in FIG. 5(d), and shown in a charged state.
Figure 5G:
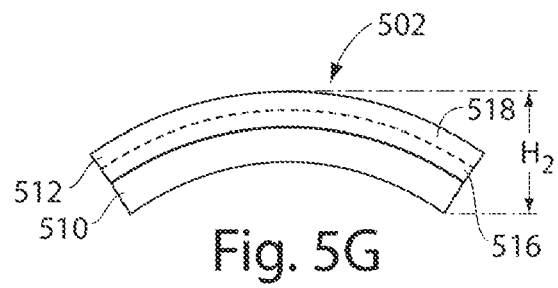
FIG. 5(g) is a schematic illustration of the electrochemical actuator of FIG. 5(f) shown in a discharged state.

A pre-bend can alternatively be formed in an opposite direction than the direction of displacement of the actuator during discharge. For example, FIG. 5(f) illustrates the electrochemical actuator 502 in a charged state and with a curved pre-bend in an opposite direction than in the example of FIG. 5(d). In this example, the actuator 502 has a pre-bend across the width W of the actuator 502 along axis A-A (see FIG. 5(c)) and has a pre-bend or charged state height h1 as shown in FIG. 5(f). The pre-bend axis defines a centerline of the eventual fold or bend of the actuator 502. When the electrochemical actuator 502 is discharged, the electrochemical actuator 502 can be displaced to a height or of H$_2$ (as shown in FIG. 5(g)) and achieve a displacement of H2−h1.

A pre-bend can be formed in an electrochemical actuator at a variety of different locations to define a desired fold or bend line for the actuator. In some embodiments, pre-bending an electrochemical actuator can be included in addition to masking a portion of a surface of the actuator (as described in the '320 publication incorporated by reference above) to increase the displacement rate of the masked actuator. In some embodiments, an actuator can be masked, but not include a pre-bend. The masking can be disposed at a variety of different locations to achieve the desired amount of displacement and/or rate of displacement of the actuator.

Figure 6A:
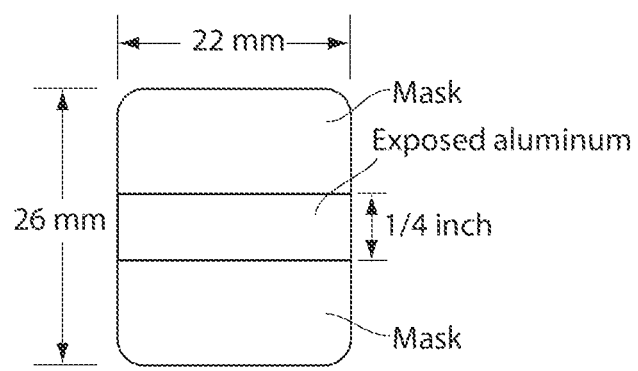
FIG. 6A is an example of a masked actuator and FIG. 6B is a graph illustrating displacement versus capacity for several masked electrochemical actuators in flat and pre-bent configurations.
Figure 6B:
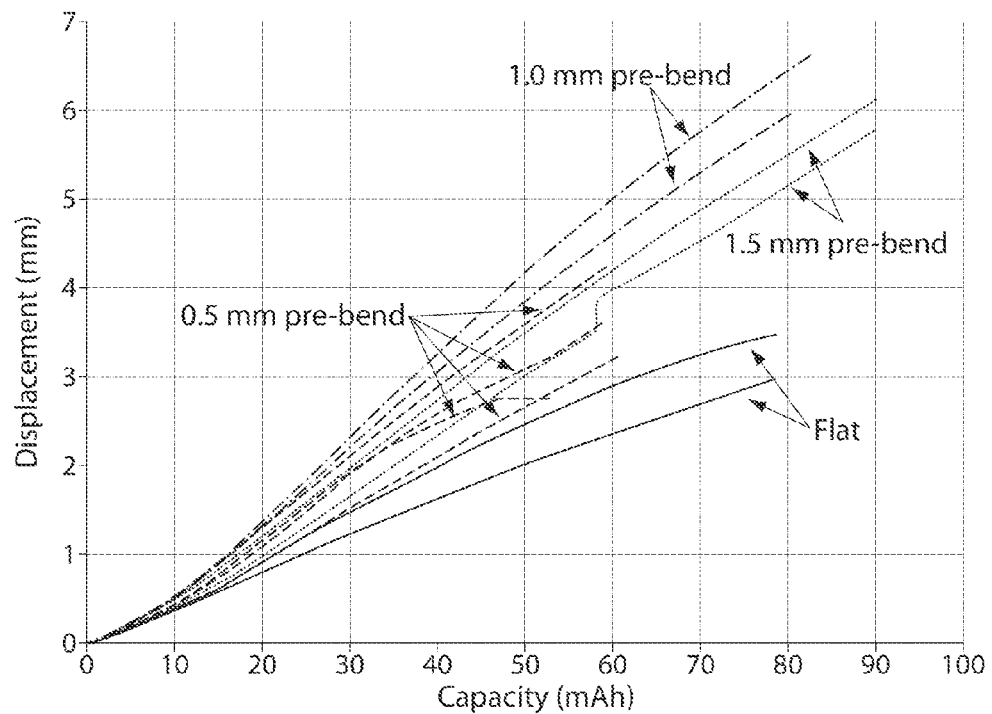

FIG. 6A illustrates a schematic representation of an actuator sample comprising a masked portion, and FIG. 6B is a graph of Displacement versus Capacity for several samples of masked rectangular shaped electrochemical actuators illustrating an increased displacement for the pre-bent actuators versus the un-bent actuators. In this example, the actuator samples had a width of 22 mm, a length of 26 mm, and a depth or height of 1 mm, with a portion of exposed aluminum. The samples were discharged through a 221 ohm resistor.

Figure 7A:
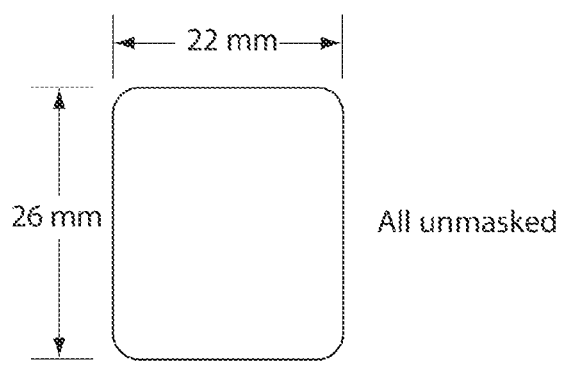
FIG. 7A is an example of an unmasked actuator and FIG. 7B is a graph illustrating displacement versus time for electrochemical actuators in flat and pre-bent configurations.
Figure 7B:
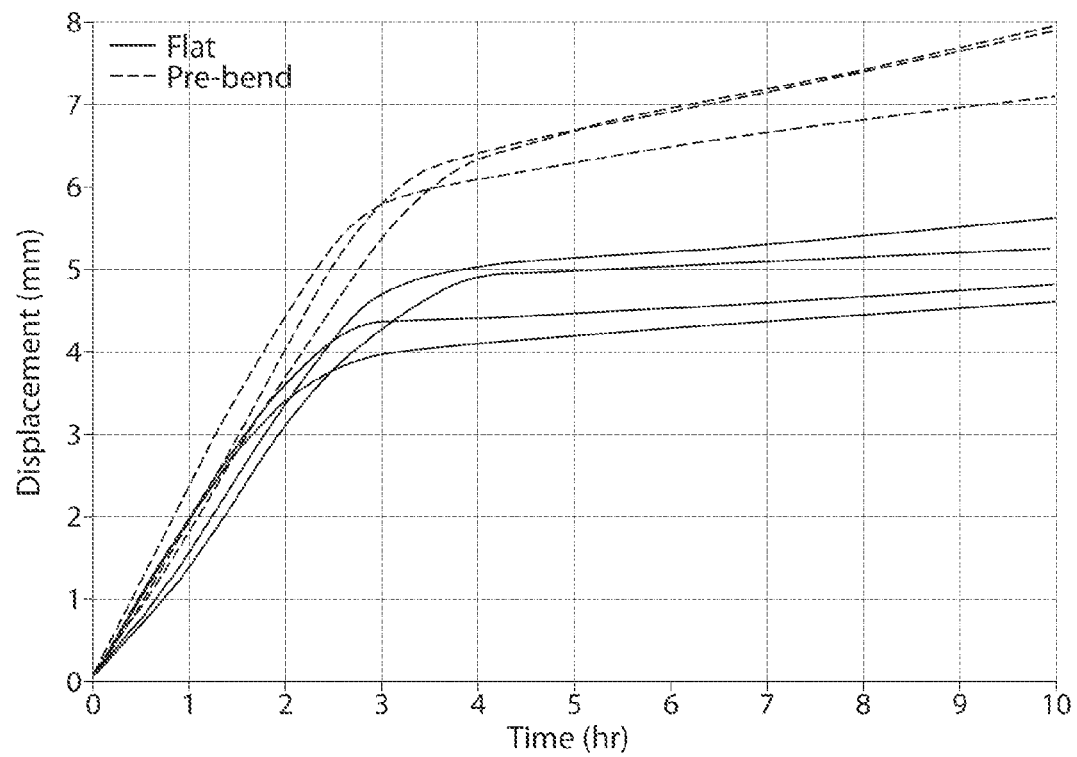

In another example, FIG. 7A illustrates a schematic representation of an unmasked actuator sample and FIG. 7B is a graph of the displacement versus time measured for rectangular shaped electrochemical actuators that were pre-bent and for electrochemical actuators that are the same size and configuration as the pre-bent electrochemical actuators, but were not pre-bent. In this example, the actuators had a width of 22 mm, a length of 26 mm and a depth or height of 1.5 mm. The actuators were discharged through a 1 ohm resistor. Such actuators can typically define a fold axis across the width of the actuator. The pre-bent actuators were pre-bent along an axis defined by the width of the actuator. All of the sample actuators were pre-lithiated and subsequently discharged through a fixed 1 ohm resistor. As shown in FIGS. 7A and 7B, all of the actuators displace initially at a high rate before slowing significantly. The maximum displacement rate is similar for both the pre-bent and un-bent actuators initially, but the pre-bent samples displace 6 mm before slowing down, while the flat samples displace between 2.75-4.5 mm before slowing down.

Figure 8A:
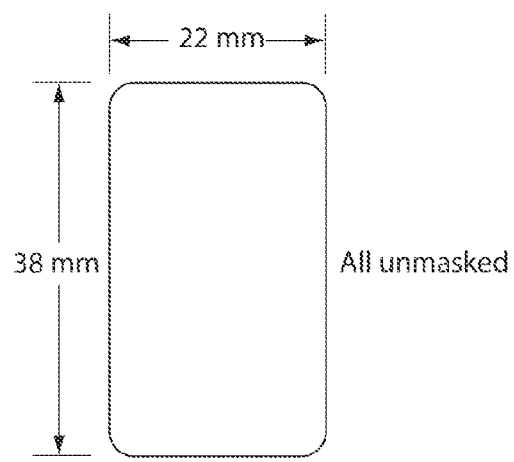
FIG. 8A is an example of an unmasked actuator and FIG. 8B is a graph illustrating displacement versus time for electrochemical actuators in flat and pre-bent configurations.
Figure 8B:
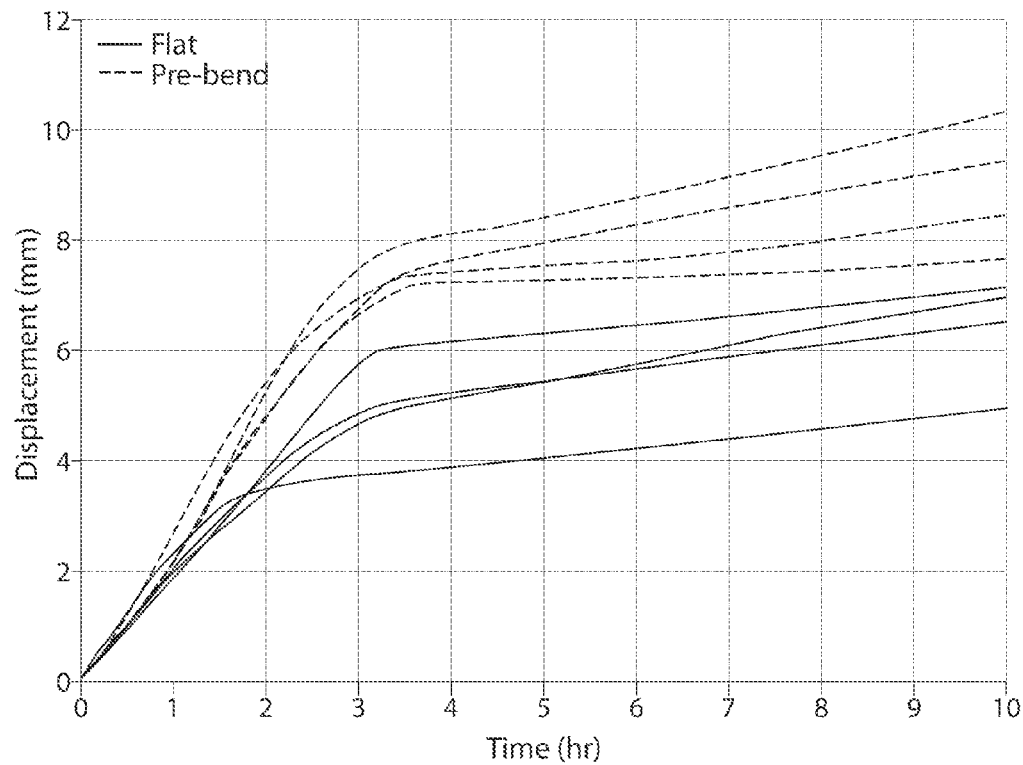

FIG. 8A illustrates another example of an unmasked actuator and FIG. 8B is a graph of displacement versus time for rectangular shaped electrochemical actuators that were pre-bent and for electrochemical actuators that are the same size and configuration as the pre-bent electrochemical actuators, but were not pre-bent. In this example, the actuators had a width of 22 mm, a length of 38 mm and a depth or height of 1.5 mm. The actuators were discharged through a 1 ohm resistor. Such actuators can typically define a fold axis across the length of the actuator when not pre-bent. As with the previous example, the pre-bent actuators were pre-bent along an axis defined by the width of the actuator.

Figure 9:
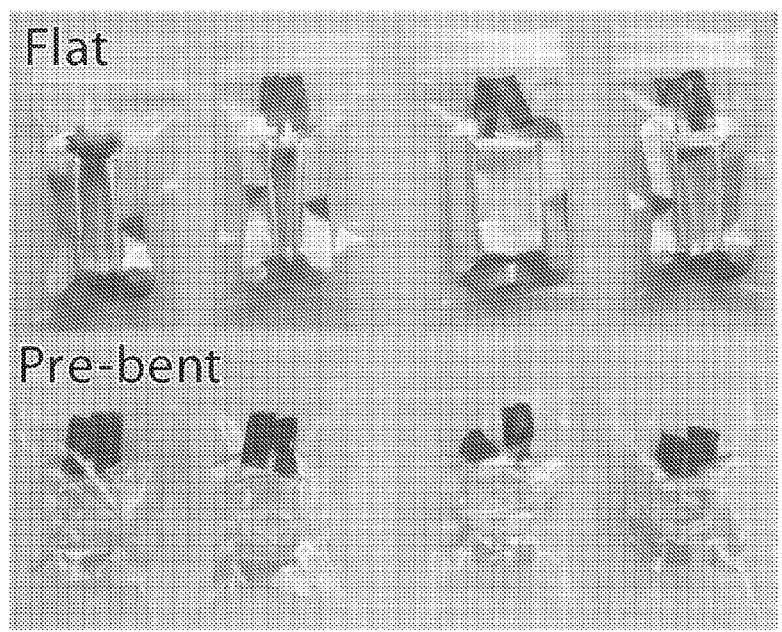
FIG. 9 shows images of the flat and pre-bent electrochemical actuators used to generate the data in FIGS. 8A and 8B, each shown in a discharged state.

All of the sample actuators were pre-lithiated and subsequently discharged through a fixed 1 ohm resistor. As shown in FIGS. 8A and 8B, the displacement rate is slightly faster for the pre-bent actuators over the flat actuators. In addition, the pre-bent samples displace 7-8 mm before slowing down, while the flat samples only displace between 3-6 mm before slowing. For these larger samples, pre-bending across the 22 mm direction (e.g., the width) led to a faster displacement rate, a larger displacement at that rate, and a folding axis across the 22 mm direction, which is perpendicular to where it appears for flat samples. FIG. 9 illustrates the difference in the folding axis for the pre-bent actuators versus the flat or unbent actuators after displacement, for the actuator samples described in FIGS. 8A and 8B. As shown in FIG. 9, the flat actuators have a folding axis that extends along the length of the actuator, whereas the pre-bent actuators have a folding axis along the width of the actuators.

CONCLUSION

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. For example, although only some embodiments of an electrochemical actuator were described as including a pre-bend, other embodiments of an electrochemical actuator, such as those described in the patens and publications incorporated herein by reference, can include a pre-bend as described herein. In addition, the specific configurations of the various components and embodiments can also be varied. For example, the size and specific shape of the various components can be different than the embodiments shown, while still providing the functions as described herein.

What is claimed is:

1. An actuator device, comprising:
   an electrochemical cell including a negative electrode and a positive electrode, wherein at least a portion of the negative electrode is formed with a material formulated to at least one of intercalate, de-intercalate, alloy with, oxidize, reduce, or plate with a first portion of the positive electrode to an extent different than a second portion of the positive electrode upon charging or discharging of the electrochemical cell such that a differential strain is imparted between the first portion and the second portion of the positive electrode, the electrodes being mechanically coupled such that the differential strain produces a displacement of at least a portion of the electrochemical cell,
   at least a portion of at least one of the positive electrode and the negative electrode having a non-planar configuration prior to charging or discharging along an axis thereof to define a fold axis, the displacement of the at least a portion of the electrochemical cell being preferentially enhanced about the fold axis.

2. The actuator device of claim 1, wherein the positive electrode is formed at least in part with an aluminum metal and the negative electrode is formed at least in part with a lithium metal.

3. The actuator device of claim 1, wherein the material of the negative electrode intercalates, de-intercalates, alloys with, oxidizes, reduces, or plates with the first portion of the positive electrode but not with the second portion of the positive electrode.

4. The actuator device of claim 1, further comprising a structure coupled to the electrochemical cell configured to be displaced from a first orientation to a second orientation by displacement of the electrochemical cell.

5. The actuator device of claim 1, wherein the displacement of the electrochemical cell applies a force on a reservoir, causing a volume displacement from the reservoir.

6. The actuator device of claim 1, wherein the electrochemical cell has a total displacement potential which is greater with the enhanced displacement about the fold axis than without the enhanced displacement.

7. The actuator device of claim 1, wherein the electrochemical cell has a rate of displacement which is greater with the enhanced displacement about the fold axis than without the enhanced displacement.

8. An actuator device constructed and arranged to be displaced from a first orientation to a second orientation, comprising:
an electrochemical cell including a negative electrode and a positive electrode, wherein at least one of the negative electrode and the positive electrode is an actuator, the actuator having a non-planar configuration prior to charging or discharging of the electrochemical cell,
wherein, upon charge and/or discharge of the electrochemical cell, differential strain produces a displacement about a fold axis from the first orientation to the second orientation.

9. The actuator device of claim 8, wherein the enhanced displacement about the fold axis increases a total displacement potential of the electrochemical cell.

10. The actuator device of claim 8, wherein the enhanced displacement about the fold axis increases a rate of displacement of the electrochemical cell.

11. The actuator device of claim 8, wherein at least a portion of the negative electrode is formed with a material formulated to at least one of intercalate, de-intercalate, alloy with, oxidize, reduce, or plate with a first portion of the positive electrode to an extent different than a second portion of the positive electrode such that a differential strain is imparted between the first portion and the second portion of the positive electrode.

12. The actuator device of claim 8, wherein the negative electrode and the positive electrode are mechanically coupled such that the differential strain produces a displacement of at least a portion of the electrochemical cell upon charging or discharging of the electrochemical cell.

13. The actuator device of claim 8, wherein the electrochemical cell is initially in a charged state and discharging of the electrochemical cell produces a displacement of the actuator.

14. The actuator device of claim 8, wherein the actuator has a non-zero first displacement in the first orientation, and a second displacement in the second orientation, the second displacement being greater than the first displacement.

15. The actuator device of claim 8, wherein the material of the negative electrode intercalates, de-intercalates, alloys with, oxidizes, reduces, or plates with a first portion of the positive electrode but not with a second portion of the positive electrode.

16. The actuator device of claim 8, wherein the displacement of the electrochemical cell causes the actuator to apply a force on a reservoir coupled to the electrochemical cell such that a fluid is delivered from the reservoir.

17. The actuator device of claim 8, wherein the actuator has a radius of curvature in a first direction in the first orientation, and a radius of curvature in a second direction, different than the first direction, in the second orientation.

18. The actuator device of claim 8, wherein the actuator has a non-planer configuration in a first direction prior to charging or discharging, and a non-planar configuration in a second direction after charging or discharging, the second direction being different than the first direction.

19. An actuator device, comprising:
an electrochemical actuator including a negative electrode and a positive electrode, wherein at least a portion of the negative electrode is formed with a material formulated to at least one of intercalate, de-intercalate, alloy with, oxidize, reduce, or plate with the positive electrode such that a differential strain is imparted to the positive electrode upon charging or discharging of the electrochemical actuator, the negative electrode and the positive electrode being mechanically coupled such that the differential strain produces a displacement of at least a portion of the electrochemical actuator from a first orientation to a second orientation,
the positive electrode including a first portion, a second portion and a medial portion disposed between the first portion and the second portion, the second portion being angularly offset from the first portion about the medial portion such that the second portion has a non-zero first displacement in the first orientation with respect to the first portion, and the actuator having a second displacement in the second orientation, the second displacement being greater than the first displacement.

20. The actuator device of claim 19, wherein the angular offset defines a fold axis, the displacement of the electrochemical actuator being enhanced about the fold axis.

21. The actuator device of claim 19, wherein movement of the actuator from the first orientation to the second orientation applies a force on a reservoir, causing a volume displacement from the reservoir.

22. The actuator device of claim 19, wherein the material is formulated to at least one of intercalate, de-intercalate, alloy with, oxidize, reduce, or plate with the medial portion of the positive electrode to a different extent than the first and second portions of the positive electrode.

23. The actuator device of claim 1, wherein, prior to charging or discharging of the electrochemical cell, the fold axis is positioned along or within a curved portion having a radius of curvature that changes by less than 10% along the length of the curved portion.

* * * * *